United States Patent
Hatch

(10) Patent No.: US 9,765,562 B2
(45) Date of Patent: Sep. 19, 2017

(54) WEATHER BASED NOTIFICATION SYSTEMS AND METHODS FOR HOME AUTOMATION

(71) Applicant: Vivint, Inc., Provo, UT (US)

(72) Inventor: Brandon Gordon Hatch, Provo, UT (US)

(73) Assignee: Vivint, Inc., Provo, UT (US)

(*) Notice: Subject to any disclaimer, the term of this patent is extended or adjusted under 35 U.S.C. 154(b) by 119 days.

(21) Appl. No.: 14/272,194

(22) Filed: May 7, 2014

(65) Prior Publication Data

US 2015/0325096 A1 Nov. 12, 2015

(51) Int. Cl.
| | | |
|---|---|---|
| *G08B 21/00* | (2006.01) | |
| *G08B 17/06* | (2006.01) | |
| *G05B 19/00* | (2006.01) | |
| *G08C 19/00* | (2006.01) | |
| *H04Q 1/30* | (2006.01) | |
| *G08G 1/07* | (2006.01) | |
| *B60R 25/10* | (2013.01) | |
| *G08B 23/00* | (2006.01) | |
| *H04B 3/00* | (2006.01) | |
| *E05F 15/71* | (2015.01) | |
| *G08B 21/18* | (2006.01) | |
| *H04L 12/28* | (2006.01) | |
| *F24F 11/00* | (2006.01) | |

(Continued)

(52) U.S. Cl.
CPC ............ *E05F 15/71* (2015.01); *F24F 11/001* (2013.01); *F24F 11/006* (2013.01); *G05B 15/02* (2013.01); *G08B 21/18* (2013.01); *H04L 12/2816* (2013.01); *H04L 12/2827* (2013.01); *F24F 2011/0058* (2013.01); *G05B 2219/2642* (2013.01); *G08B 21/10* (2013.01)

(58) Field of Classification Search
CPC ...... G08B 25/14; G08B 25/08; G08B 27/006; G08B 13/00; G08B 13/08; G08B 13/19658; G08B 13/19684; G08B 21/0275; G08B 21/0283; G08B 25/016; G08B 21/028; F24F 11/0086; F24F 11/0012; F24F 11/0034; G05B 15/02; G05B 13/02

See application file for complete search history.

(56) References Cited

U.S. PATENT DOCUMENTS

| | | | | |
|---|---|---|---|---|
| 3,513,466 A | * | 5/1970 | Isaacs ................. | B60R 25/1003 340/430 |
| 4,464,651 A | * | 8/1984 | Duhame .............. | G08B 17/117 318/16 |

(Continued)

*Primary Examiner* — Steven Lim
*Assistant Examiner* — Muhammad Adnan
(74) *Attorney, Agent, or Firm* — Holland & Hart LLP

(57) ABSTRACT

Methods and systems are described for generating weather related notices using features of a home automation system. According to at least one embodiment, an apparatus for generating weather related notices with a home automation system includes a processor, a memory in electronic communication with the processor, and instructions stored in the memory. The instructions are executable by the processor to receive weather data about current weather conditions, receive status information about at least one barrier of a property monitored by the home automation system, and generate at least one notice based at least in part on the weather data and the status information.

19 Claims, 10 Drawing Sheets

(51) Int. Cl.
*G05B 15/02* (2006.01)
*G08B 21/10* (2006.01)

(56) References Cited

U.S. PATENT DOCUMENTS

| | | | |
|---|---|---|---|
| 4,683,932 A * | 8/1987 | Bubendorff | E06B 9/08 160/133 |
| 5,532,560 A * | 7/1996 | Element | E06B 9/32 160/176.1 P |
| 5,576,873 A * | 11/1996 | Crossland | H04L 12/5601 385/17 |
| 6,014,077 A * | 1/2000 | Beaumont | G08B 21/086 340/545.1 |
| 6,238,122 B1 * | 5/2001 | Brooks | G09F 21/04 403/24 |
| 6,239,690 B1 * | 5/2001 | Burbidge | H04W 52/0212 340/10.33 |
| 6,748,308 B2 * | 6/2004 | Losey | B60J 7/0573 236/49.3 |
| RE40,032 E * | 1/2008 | van Bokhorst | H04W 52/0216 370/311 |
| 7,321,788 B2 * | 1/2008 | Addy | H04L 7/08 340/10.33 |
| 7,564,362 B2 * | 7/2009 | Cole | E06B 7/32 340/506 |
| 7,730,929 B2 * | 6/2010 | Perron | E05F 17/004 160/118 |
| 8,350,694 B1 * | 1/2013 | Trundle | G08B 25/08 340/539.11 |
| 8,739,744 B2 * | 6/2014 | Charnesky | B60K 11/085 123/41.04 |
| 8,787,840 B2 * | 7/2014 | Srinivasan | H04W 52/0245 370/216 |
| 9,145,730 B1 * | 9/2015 | Santamaria | E06B 5/11 |
| 2003/0093580 A1 * | 5/2003 | Thomas | G06F 17/30787 719/318 |
| 2003/0163532 A1 * | 8/2003 | Kacalek | G08B 27/006 340/7.2 |
| 2005/0035854 A1 * | 2/2005 | Gupta | A61B 5/0062 340/531 |
| 2007/0096894 A1 * | 5/2007 | Lemmon | G08B 25/14 340/506 |
| 2009/0143918 A1 * | 6/2009 | Amundson | F24F 11/0086 700/278 |
| 2009/0237487 A1 * | 9/2009 | Santini | H04L 12/282 348/14.01 |
| 2009/0243852 A1 * | 10/2009 | Haupt | G01W 1/00 340/541 |
| 2009/0316671 A1 * | 12/2009 | Rolf | H04W 4/02 370/338 |
| 2010/0262293 A1 * | 10/2010 | Byberg | E06B 9/68 700/275 |
| 2010/0289643 A1 * | 11/2010 | Trundle | F24F 11/0086 340/545.1 |
| 2010/0332034 A1 * | 12/2010 | Bergeson | E06B 7/08 700/275 |
| 2012/0072034 A1 * | 3/2012 | Cathcart | B63B 19/12 700/282 |
| 2013/0060389 A1 * | 3/2013 | Marsters | A01G 25/16 700/284 |
| 2013/0184874 A1 * | 7/2013 | Frader-Thompson | F24F 11/0001 700/276 |
| 2014/0201315 A1 * | 7/2014 | Jacob | H04L 12/2803 709/217 |
| 2015/0148967 A1 * | 5/2015 | Logan | G06F 1/26 700/276 |

* cited by examiner

WEATHER BASED NOTIFICATION SYSTEMS AND METHODS FOR HOME AUTOMATION

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of home automation and security products. Advancements in mobile devices allow users to monitor and/or control an aspect of a home or business. As home automation and security products expand to encompass other systems and functionality in the home, challenges exist in accounting for and responding to environmental conditions such as weather.

SUMMARY

Methods and systems are described for generating weather related notices using features of a home automation system. According to at least one embodiment, an apparatus for generating weather related notices with a home automation system includes a processor, a memory in electronic communication with the processor, and instructions stored in the memory. The instructions are executable by the processor to receive weather data about current weather conditions, receive status information about at least one barrier of a property monitored by the home automation system, and generate at least one notice based at least in part on the weather data and the status information.

In one example, the status information about one or more barriers may include information about an open state of the one or more barriers. The weather data may include a probability of a weather event occurring. Generating the at least one notice may occur if the probability of the weather event exceeds a threshold probability level. The at least one notice may include one of a displayed message and an audible message that the at least one barrier should be opened or closed. The weather data may include at least one of a temperature, a wind speed, and a chance of precipitation. The instructions may be executable by the processor to automatically open or close the at least one barrier based on the weather data. The instructions may be executable by the processor to receive status information about at least one appliance of a property monitored by the home automation system, and automatically adjust operation of the at least one appliance based on the weather data.

Another embodiment relates to a computer-program product for generating weather condition-based notices with a home automation system. The computer-program product includes a non-transitory computer-readable medium storing instructions executable by a processor to receive periodic weather notices, receive status information concerning at least one barrier or at least one appliance of a building, and generate a notice providing a recommended change in status of the at least one barrier or at least one appliance based at least in part on the weather notices.

In one example, the instructions may be executable by the processor to automatically operate the at least one barrier or the at least one appliance based at least in part on the weather notices. The instructions may be executable by the processor to display the notice on a control panel of the home automation system. The instructions may be executable by the processor to transmit the notice to a remote handheld device. The notice may include at least one of a graphic, a sound, a light indicator, or a vibration. The periodic weather notices may be routed through a backend server to a control panel of the home automation system.

A further embodiment relates to a computer-implemented method for processing weather information with a home automation system. The method includes receiving weather information at a control panel of the home automation system, and generating recommendations for changing at least one condition of a property monitored by the home automation system based at least in part on the weather information and at least one predetermined rule.

In one example, the weather information may be received from a backend server of the home automation system. The at least one condition may be at least one of an open state of at least one barrier of the property, an operation state of a sprinkler system of the property, and an operation state of an HVAC system of the property. The at least one predetermined rule may include one of a threshold temperature and a threshold chance of precipitation. Receiving weather information may include receiving weather information from at least one of a remote weather database and at least one local weather sensor. The method may also include delivering the recommendations to at least one user of the property.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
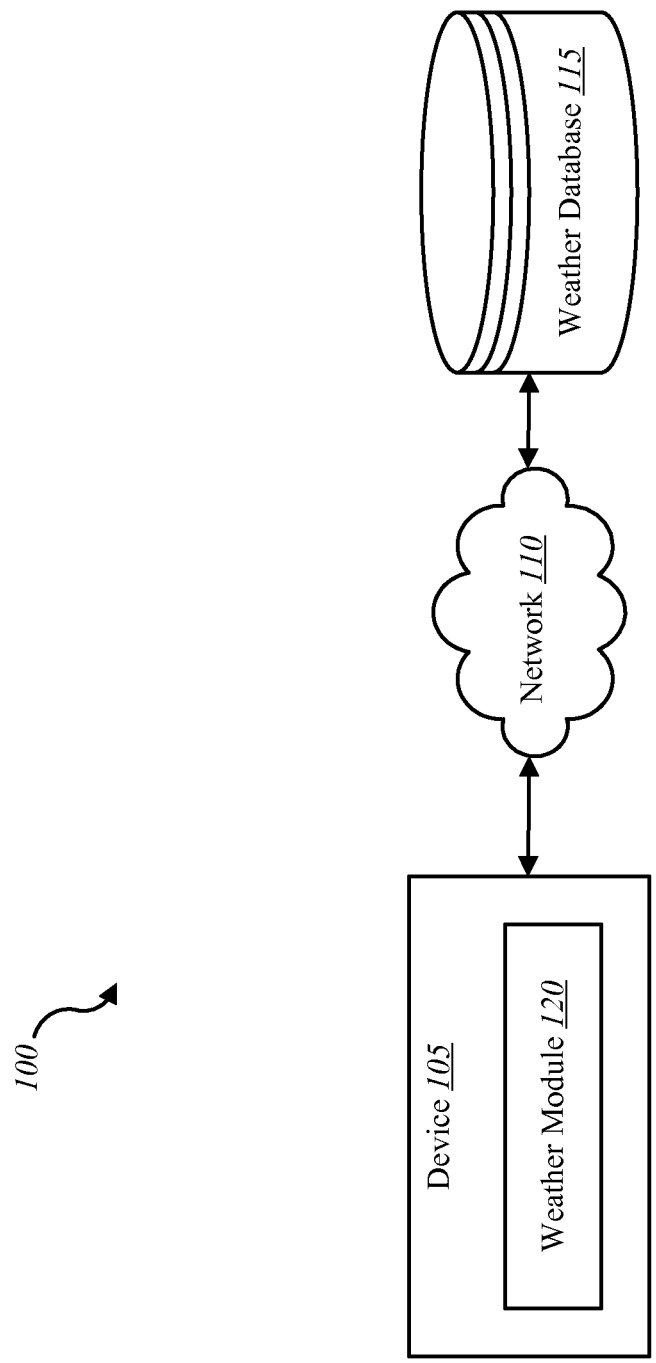
FIG. 1 is a block diagram of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to home automation and home security, and related security systems and automation for use in commercial and business settings. More specifically, the systems and methods described herein relate to weather based notifications using a home automation system, and/or operating aspects of the home automation system based at least in part on weather related information. As used herein, the phrase "home automation system" may refer to a system that includes automation features alone, security features alone, a combination of automation and security features, or a combination of automation, security and other features. While the phrase "home automation system" is used throughout to describe a system or components of a system or environment in which aspects of the present disclosure are described, such an automation system and its related features (whether automation and/or security features) may be generally applicable to other properties such as businesses and commercial properties as well as systems that are used in indoor and outdoor settings.

One aspect of the present disclosure relates to controlling at least some functionality of a home automation system in response to weather-related information. The weather-related information may include, for example, forecasted weather information and/or real-time weather conditions. The weather-related information may be provided from a source located remote from a property being monitored by a home automation system. In other examples, the weather-related information may be provided by sensors or other devices located locally (i.e., in close proximity) to a property monitored by the home automation system.

The home automation system may be programmed to provide communication with a user of the home automation system and/or a resident at the property being monitored by the home automation system. The communications may include, for example, current weather conditions, forecasted weather conditions, recommendations concerning proposed actions to account for current or forecasted weather conditions, or updates concerning automated functions of the home automation system in response to the current and/or forecasted weather conditions. Another aspect of the present disclosure relates to the automated functions of a home automation system that may occur in response to receiving current and/or forecasted weather conditions. A still further aspect of the present disclosure relates to automatically adjusting an HVAC system of a property in response to current and/or forecasted weather conditions. Another aspect of the present disclosure relates to automated opening and/or closing of barriers of a property (e.g., doors and windows of a home) to optimize heating and/or cooling of the property based on current weather conditions and/or prepare for forecasted weather conditions. Another aspect of the present disclosure relates to controlling or proposing controls for a sprinkler system associated with a property monitored by the home automation system in response to current and/or forecasted weather conditions.

The current and/or forecasted weather information may be provided by a third party weather service such as, for example, Weather.com®. The third party weather service may push weather information directly to individual control panels of a plurality of different home automation systems. In another example, the weather information from a third party weather service pushes weather information to a backend server that then pushes the weather information to individual control panels for a plurality of home automation systems. The backend server may receive weather information from a third party weather service for a plurality of different geographic areas, determine which control panels are associated with each geographic area, and push weather information relevant to each geographic area to the relevant control panels (or other designated device for a given home automation system—e.g., a remote handheld device).

Referring to FIG. 1, a block diagram illustrating one embodiment of an environment 100 in which the present systems and methods may be implemented is shown. In some embodiments, the systems and methods described herein may be performed, at least in part, using a device 105. The device 105 may communicate with a weather database 115 via a network 110. Device 105 may operate a weather module 120.

In at least some embodiments, the device 105 may be a control panel of a home automation system. The home automation system may include or be part of environment 100. Device 105 may be permanently mounted (e.g., on a wall of a home), or may be carried by a mobile device (e.g., a laptop computer, tablet computer, smartphone, or the like).

Weather database 115 may provide weather-related information to weather module 120. Weather database 115 may have access to weather-related information for a plurality of different geographic areas (e.g., regions such as cities, counties, or states of the United States). The weather-related information may include current weather conditions as well as forecasted weather data. The forecasted weather may include a probability of certain forecasted weather occurring within a given time period. The weather-related information may be pushed to weather module 120. Additionally, or alternatively, the weather module 120 may reach out to (e.g., request) weather database 115 to obtain the weather-related information. The weather-related information available at weather database 115 may be continuously updated (e.g., every second or minute), or periodically based on, for example, operation of weather-related sources such as satellite images, weather stations, and sensors positioned within the geographic area of the home automation system.

Weather module 120 may operate to provide a plurality of functions and/or instructions to conduct functions based at least in part on the weather-related information received from weather database 115. For example, weather module 120 may provide a notice to a user of the home automation system of forecasted severe weather. The notice to the user may be in the form of, for example, an audible message delivered through a speaker system of a home being monitored by the home automation system, an audible message through a mobile computing device carried by a user, a text message sent to a mobile computing device carried by the user, a text message displayed on a display screen of one or more control panels of the home automation system, or an email sent to a computing device available to the user. Another operation possible for weather module 120 includes generating and/or presenting instructions to open or close one or more barriers associated with the property being monitored by the home automation system. The barrier may include, for example, a garage door, a window, a pool cover, a storm door, or the like. The instructions may be sent to a user of the home automation system and the user may manually open or close the barrier in response to the instructions. Additionally, or alternatively, the instructions may be carried out automatically based on one or more pre-set rules for the home automation system whereby one or more automated closure devices operates to open or close a given barrier or perform other functions of the home automation system.

Weather module 120 may operate to control one or more appliances or systems in response to the weather-related information. For example, the weather-related information may be forecast as a significant drop in temperature for a given period of time. The weather module 120 may control an HVAC system of a property being monitored by the home automation system to increase the thermostat setting for the property during the forecasted low temperature period. In another example, weather module 120 may use a combination of controls to optimize energy usage in a home based at least in part on weather-related information. For example, weather module 120 may automatically open or close barriers or provide recommendations to a user to manually open or close barriers. In another example, combination of opening/closing barriers with operating an HVAC system is possible so that operation of the HVAC system is minimized while taking advantage of weather conditions to heat or cool the interior of the building being monitored by the home automation system.

Figure 2:
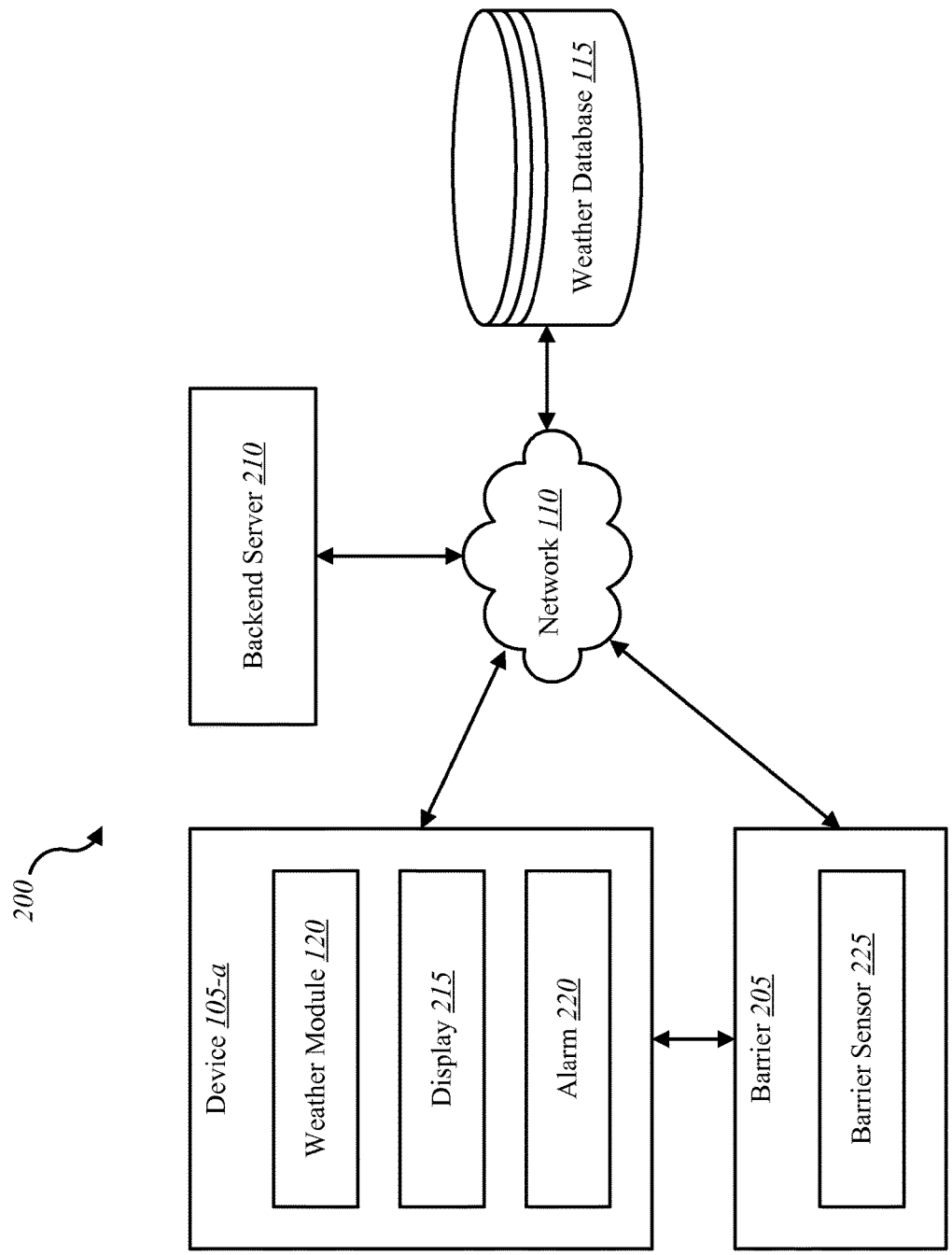
FIG. 2 is a block diagram of another environment in which the present systems and methods may be implemented.

FIG. 2 shows another environment 200 that may include the components of environment 100 described above and may further include a barrier 205 and a backend server 210. The barrier 205 may include a barrier sensor 225. Device 105-a may include, in addition to weather module 120, a display 215 and an alarm 220. Network 110 may provide communication between device 105-a, barrier 205 (or components thereof), backend server 210 and weather database 115. Network 110 may include local area networks (LAN), wide area networks (WAN), virtual private networks (VPN), wireless networks (using 802.11, for example), and/or cellular networks (using 3G and/or LTE, for example), etc. In some embodiments, network 110 may include the Internet.

Weather module 120 may convey messages to a user in response to weather-related information received from weather database 115. The notices generated by weather module 120 may be shown on display 215. The notices may be shown as, for example, a text message, a combination of flashing lights, a video, or the like. Display 215 may include, for example, a touch screen, a digital monitor, a pattern of lights (LEDs) or the like. Display 215, although shown as a component of device 105-a, may be provided as a separate device and/or component of the home automation system that is in communication with weather module 120.

Alarm 220 may be used to communicate certain information to a user. For example, alarm 220 may generate an audible message such as, for example, "severe dust storm approaching," "temperatures to drop below −15° F. tonight," or "time to close front bedroom window." Alarm 220 may produce a siren sound when, for example, a tornado is approaching. Alarm 220, although shown as a component of device 105-a, may be included as a separate device and/or component of home automation system. Alarm 220 may include a plurality of different alarm devices such as, for example, a plurality of speakers. Alarm 220 may be part of, for example, a mobile device and/or be configured to communicate with a mobile device carried by a user.

Barrier sensor 225 may provide real-time status information related to barrier 205. For example, barrier sensor 225 may communicate a signal to weather module 120 concerning an open state of barrier 205. Weather module 120, when determining recommended actions in response to weather-related information received from weather database 115, may be able to identify specific barriers 205 that are recommended for manual or automated opening and/or closing. Barrier sensor 225 may include, for example, a magnetic switch, an optical sensor, or the like.

Weather information provided by weather database 115 may be routed through network 110 to backend server 210. Backend server 210 may then provide the weather-related information to weather module 120 via network 110. As mentioned above, the weather-related information from weather database 115 may be provided directly to weather module 120 from weather database 115. Further, the weather-related information may be pushed from weather database 115 to backend server 210 and/or weather module 120, or the backend server 210 and/or weather module 120 may reach out to (e.g., request) and retrieve the weather-related information from weather database 115. Weather database 115 may be part of, for example, a third party weather service and/or weather information-related service such as, for example, Weather.com®.

Backend server 210 may process the weather-related information received from weather database 115. The processing performed by backend server 210 may include, for example, associating weather-related information based on geography, and directing the geographic associated weather-related information with weather modules (e.g., control panels and/or home automation systems) for that specific geographic area. The geographic areas may be divided, for example, by area code, zip code, county, city, state, etc. Backend server 210 may provide other services in support of device 105-a and/or weather module 120. For example, backend server 210 may notify emergency personnel in response to, for example, particular types of alarms generated by alarm 220 and/or certain current and/or forecasted weather conditions identified from the weather-related information received from weather database 115. Backend server 210 may provide information storage capability for device 105-*a* and/or a home automation system. For example, backend server 210 may store historical information related to the notices, instructions, or actions taken by weather module 120. Alternatively, such historical information may be stored on device 105-*a* or another component of the home automation system.

Figure 3:
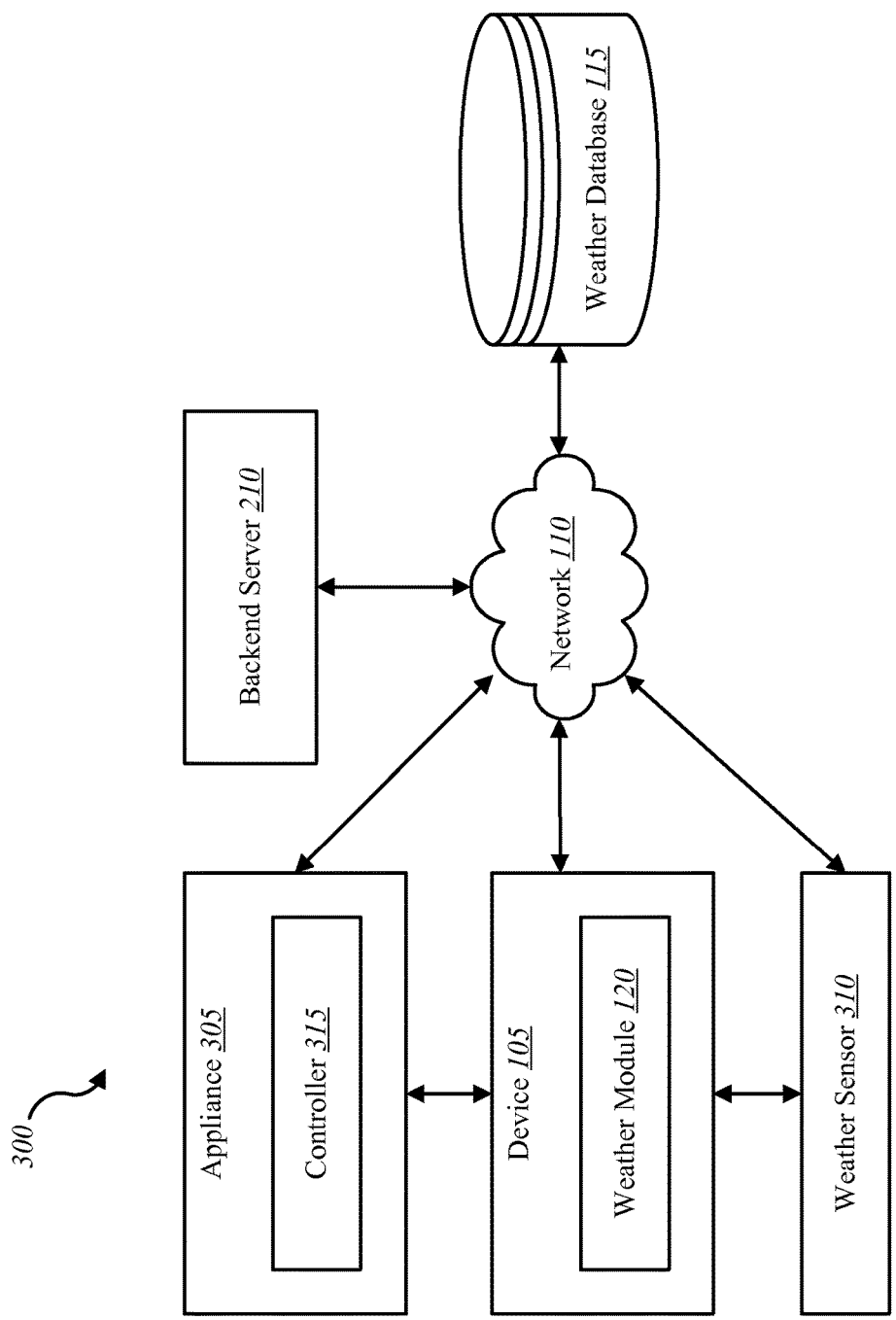
FIG. 3 is a block diagram of another environment in which the present systems and methods may be implemented.

FIG. 3 shows another environment 300 that may include the components of environments 100, 200 described above and may further include an appliance 305 and a weather sensor 310. Appliance 305 includes a controller 315. Appliance 305 may include, for example, an HVAC system, a fan, a kitchen appliance, or the like. Controller 315 may provide at least some control and/or operability of appliance 305. Controller 315 may operate in response to instructions or signals received from weather module 120. Appliance 305 and weather sensor 310 may communicate with device 105 and/or weather module 120 via network 110. Additionally, and/or alternatively, appliance 305 and weather sensor 310 may communicate with device 105 and/or weather module 120 directly.

Weather sensor 310 may be located at or in close proximity to a property being monitored by a home automation system. For example, weather sensor 310 may include a temperature sensor that is exposed on an exterior of a home where device 105 resides and is being monitored by the home automation system. The temperature sensor may provide real-time temperature readings that are used by weather module 120. The information from weather sensor 310 may be used in addition to or in place of weather-related information from weather database 115. For example, weather database 115 may provide current temperatures for a relatively large geographic area that covers the location where device 105 resides. Weather sensor 310 may provide specific temperature readings at the location of the home where device 105 resides, and may provide a different temperature that is more accurate than the temperature provided by weather database 115. Environment 300 may be configured such that information provided by weather sensor 310 is considered more relevant than the weather information provided by weather database 115 if there is conflicting weather data. Weather sensor 310 may provide other weather information such as, for example, wind speed, wind direction, barometric pressure, humidity, UV strength, air particulates, and cloud cover. Weather module 120 may operate at least in part based on real-time weather conditions provided by weather sensor 310. In at least some examples, weather sensor 310, or data provided therefrom, may be used to forecast further weather conditions. Weather module 120 may operate at least in part based on the forecasted weather conditions determined from data provided by weather sensor 310. In at least some examples, weather module 120 helps determine forecasted weather conditions based on the data from weather sensor 310.

Figure 4:
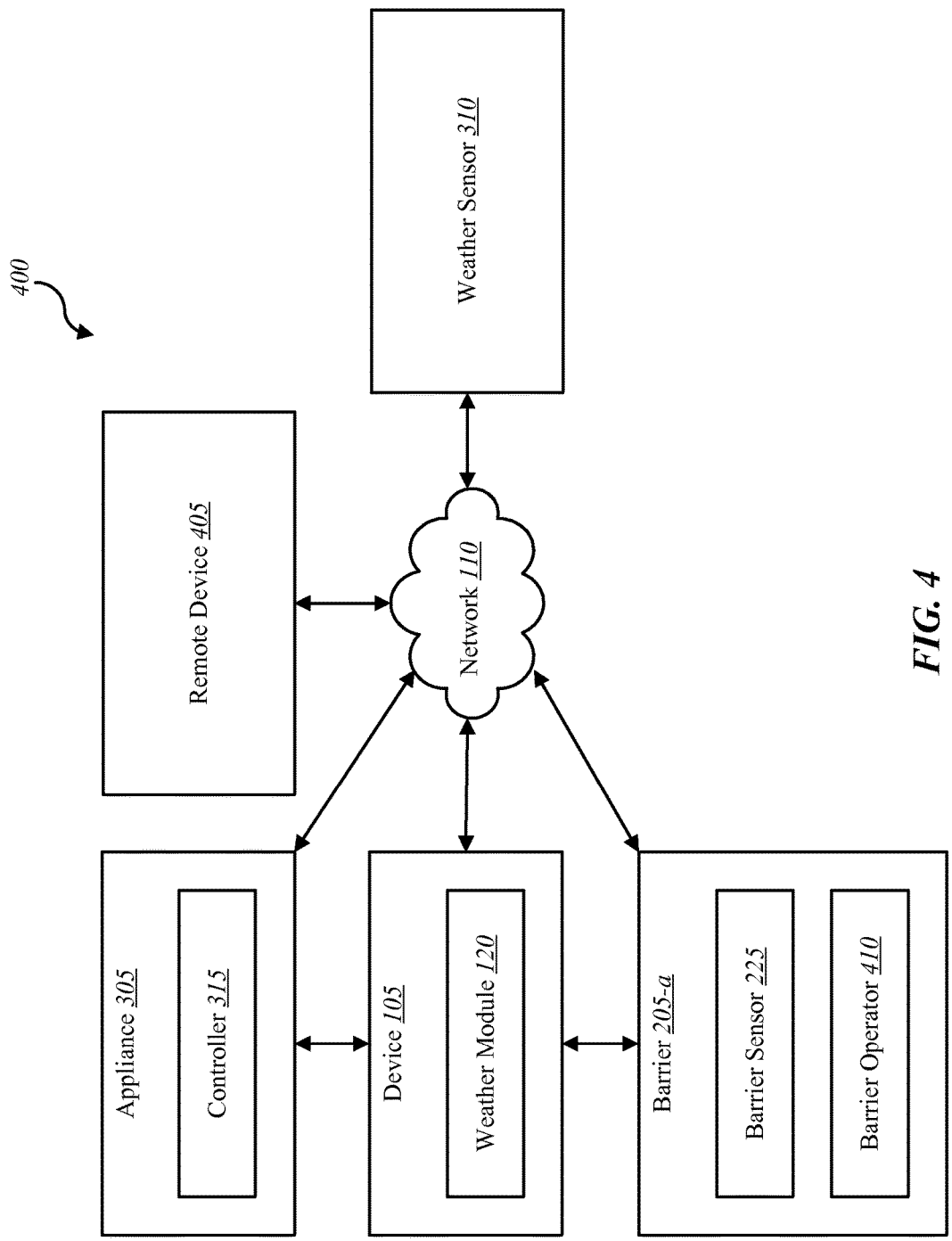
FIG. 4 is a block diagram of another environment in which the present systems and methods may be implemented.

FIG. 4 shows another environment 400 that may include the components of environments 100, 200, 300 described above, and may further include a remote device 405. Environment 400 includes device 105 having weather module 120, barrier 205-*a* having barrier sensor 225 and a barrier operator 410, appliance 305 having a controller 315, and weather sensor 310.

Remote device 405 may include, for example, a mobile computing device in possession of a user (e.g., an owner of a home being monitored by a home automation system where device 105 resides). Weather module 120 may operate to push notifications to remote device 405. The notifications may include, for example, recommendations for opening or closing barrier 205-*a* based on an open state of the barrier 205-*a* determined from barrier sensor 225. The notifications may include, for example, information about forecasted severe weather or current severe weather conditions. The weather conditions, whether current or forecasted, may be provided by weather sensor 310. Weather sensor 310 may be positioned at or in close proximity to a property being monitored by a home automation system where device 105 resides. Weather sensor 310 may include any of the features and/or functionality described above with reference to environment 300.

Remote device 405 may be operated by a user to control, for example, appliance 305 and/or barrier 205-*a*. In one example, a user operates remote device 405 to send instructions to operate barrier operator 410 to open or close barrier 205-*a* in response to weather module 120 sending a notice to remote device 405 that barrier 205-*a* is in an open state (e.g., via barrier sensor 225) and a certain weather current condition or forecasted weather condition has met predetermined criteria. The criteria may include, for example, a forecasted weather condition of a certain probability, e.g., 70% or 80% chance of the weather occurring. In another example, the criteria is an outside temperature dropping below 60° (e.g., indicating a window should be opened) or a temperature above 75° (e.g., indicating that a window should be closed). Different types of notices may be generated depending on the probability of certain forecasted weather and the timeframe within which the forecasted weather is expected to occur.

In another example, barrier operator 410 may operate automatically in response to instructions received from weather module 120. Weather module 120 may determine that barrier 205-*a* should be opened or closed based at least in part on a current and/or forecasted weather condition. In one example, one of a severe rainstorm, severe windstorm, blizzard, or rapid change in temperature is forecasted with a certain level of probability that the weather will actually occur. Weather module 120 may send instructions to barrier operator 410 to automatically open or close barrier 205-*a* within a given period of time when the forecasted weather condition is expected to occur at the location of the property being monitored by the home automation system.

Weather module 120 may provide a notice or recommendation to one or more users for opening or closing barrier 205-*a* or operating appliance 305 in a way that is independent of operations of remote device 405. As discussed above, weather module 120 may, for example, display a message, generate an audible message, generate an alarm, or the like, to one or more users at the property being monitored by the home automation system or at another location where the user resides (e.g., at a remote work station, in a car, etc.).

Weather sensor 310 may be used in combination with or in place of a weather database such as weather database 115 described with reference to FIGS. 1-3. Weather sensor 310 may provide at least some weather information to a weather database such as weather database 115 that provides weather-related information to weather module 120.

Figure 5:
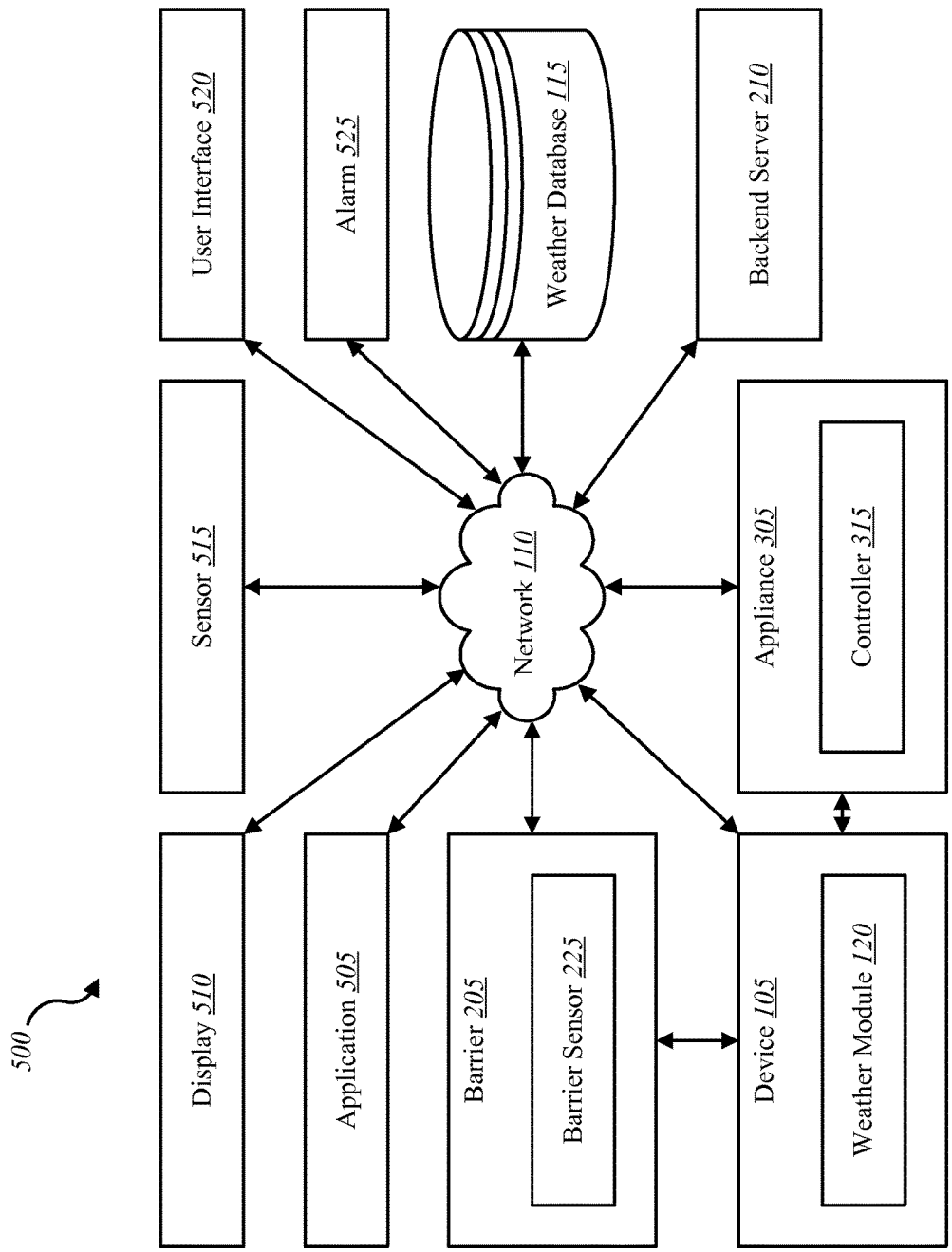
FIG. 5 is a block diagram of another environment in which the present systems and methods may be implemented.

FIG. 5 shows another environment 500 that may include the components of environments 100, 200, 300, 400 described above, and may further include an application 505, a display 510, a sensor 515, a user interface 520, and/or an alarm 525. Environment 500 may also include barrier 205 having barrier sensor 225, device 105 having a weather module 120, appliance 305 having controller 315, backend server 210, and/or a weather database 115. Any of the components of environment 500 may be included in any one of the other environments 100, 200, 300, 400 described herein.

Application 505 may allow a user to control (either directly or via device 105) an aspect of the monitored property including security, energy management, locking and unlocking doors, checking the status of the door, locating a user or item, controlling lighting, thermostat, or cameras, and receiving notifications regarding a current status or anomaly associated with a home, office, place of business, and the like. In some configurations, application 505 may enable device 105 to interface with weather module 120, appliance 305, controller 315, barrier sensor 225, backend server 210, and/or weather database 115. Application 505 may provide the display 510 and/or user interface 520 to display automation, security, and/or energy management content on device 105 and/or, for example, remote device 405 shown in FIG. 4. Thus, application 505, via display 510 and/or user interface 520, may allow users to control aspects of their home, office, and/or other type of property. Further, application 505 may be installed on device 105, remote device 405 (see FIG. 4), or appliance 305 in order to allow user to interface with a function of one of those devices and/or components.

Display 510 may include, for example, a digital display as part of, for example, a control panel of environment 500 (e.g., a home automation system control panel). Display 510 may be provided via devices such as, for example, a desktop computer or mobile computing device (e.g., remote device 405). The user interface 520 may be integrated into display 510. Such a user interface 520 may include a plurality of menus, screens, microphones, speakers, cameras, and other capabilities that permit interaction between the user and the home automation system or any components of environment 500. Additionally, or alternatively, the user interface 520 with display 510 may be integrated into device 105, remote device 405, appliance 305, or other devices or components of environment 500. Display 510 may be used to display notices, recommendations, alarms, or the like, from weather module 120 as a way to communicate with one or more users of the home automation system.

Sensor 515 may include, for example, a camera sensor, an audio sensor, a forced-entry sensor, a shock sensor, a proximity sensor, a boundary sensor, an appliance sensor, a light fixture sensor, a temperature sensor, a light beam sensor, a three dimensional (3D) sensor, a motion sensor, a smoke sensor, a glass break sensor, a door sensor, a video sensor, a carbon monoxide sensor, an accelerometer, a global positioning system (GPS) sensor, a Wi-Fi positioning sensor, a capacitance sensor, a radio frequency sensor, a near-field sensor, a heartbeat sensor, a breathing sensor, an oxygen sensor, a carbon dioxide sensor, a brain wave sensor, a motion sensor, a voice sensor, a touch sensor, and the like. The sensor 515 may include at least some of the features and functionality of weather sensor 310 described with reference to FIGS. 3 and 4. Although sensor 515 is depicted as a separate component from device 105 and other components of environment 500, in some embodiments, sensor 515 may be connected directly to any one of these components. Additionally, or alternatively, sensor 515 may be integrated into a home appliance such as appliance 305, which may be an appliance positioned interior to or exterior to a building (e.g., home) being monitored by a home automation system. Barrier sensor 225 may be one example of sensor 515.

Alarm 525 may be one example of alarm 220 of device 105-a shown in FIG. 2. Alarm 525 may be associated with any number of devices, systems or the like associated with a property being monitored by a home automation system or a remote device. Alarm 525 may provide communication between weather module 120 and one or more users, emergency personnel, or the like, to convey notices, recommendations, or emergency information associated with weather-related information or the effects of current weather conditions.

Figure 6:
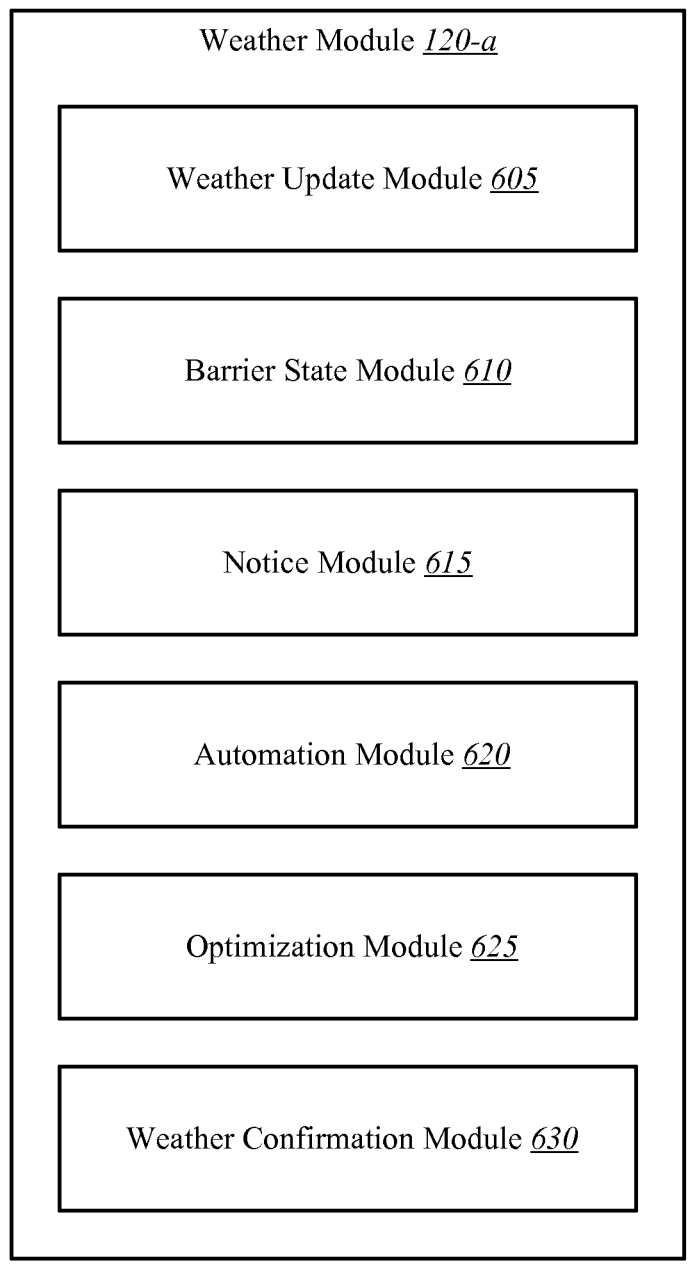
FIG. 6 is a block diagram of a weather module for use in at least one of the environments shown in FIG. 1-5.

FIG. 6 is a block diagram illustrating a weather module 120-a, which may be one example of the weather module 120 described above with reference to FIGS. 1-5. Weather module 120-a may include a weather update module 605, a barrier state module 610, a notice module 615, an automation module 620, an optimization module 625, and a weather confirmation module 630. Other embodiments of weather module 120 may include more or fewer of the modules shown in FIG. 6.

Weather update module 605 may provide communication with one or more sources of weather-related information. Weather update module 605 may actively reach out to obtain weather-related information from, for example, a weather sensor (e.g., weather sensor 310) or a weather database (e.g., weather database 115). Weather update module 605 may store weather-related information and may tag the weather-related information as the most current information available until replaced with updated weather-related information. In at least some examples, weather update module 605 may compare forecasted weather-related information with the weather that actually occurs, which may influence, for example, how frequently the weather information is updated in the future or whether a different source of weather-related information should be used. In other examples, weather update module 605 may obtain weather-related information from a plurality of different sources and may conduct at least some analysis related to, for example, current conditions and/or determining probabilities of expected weather conditions.

Barrier state module 610 may obtain information about the open state of a plurality of barriers (e.g., barrier 205) associated with a property being monitored by a home automation system. Barrier state module 610 may maintain open state information about each of the barriers. The open state information may be used by barrier state module 610 as part of providing notifications to users related to which barrier should be opened or closed given current or expected weather conditions, or automatically opening or closing the barriers based on weather-related information.

Notice module 615 may operate to generate notices to users in response to weather-related information. For example, notice module 615 may generate alarms, audible commands, text messages, or the like to communicate information to a user, wherein the information is determined at least in part based on weather-related information. For example, notice module 615 may provide a notice to a user to open or close one or more barriers, adjust a thermostat setting, adjust a sprinkler system setting, or the like in response to a weather forecast indicating a high probability of a certain weather event occurring or an actual current weather condition. In one example, notice module 615 notifies a user via the user's handheld mobile device that rain has occurred at the property being monitored by the home automation system and that it is recommended that the user turn off the sprinkler system for the property for at least the next 24 hours. In another example, the weather forecast information indicates a 80% chance of significant wind in the coming 24 hours, and notice module 615 provides a notice to the user recommending putting garbage cans in the garage, storing patio furniture, putting down an awning, and/or closing all windows for the coming 24 hour period. In a still further example, notice module 615 generates a notice to the user that the HVAC system has been turned off for the past 8 hours because the outdoor temperature has been within a predetermined temperature range within which the home automation system has been programmed by the user to automatically turn off the HVAC system (e.g., the range of 60°-75°).

Automation module 620 may operate to provide at least some automated functions in response to the weather-related information received by weather module 120-a. Automation module 620 may provide instructions, signals, or other automated features to conduct, for example, opening or closing a barrier, generating a notice, turning on or off an appliance or system associated with the building or property being monitored by the home automation system, turning on or off a sprinkler system, operating a pool cover or heating system for a pool, operating window blinds, or the like.

Optimization module 625 may provide at least some logic, processing or controls associated with optimization of energy usage, water usage, device usage, and the like, in response to the received weather-related information. For example, optimization module 625 may operate to optimize energy consumption while maintaining a home interior temperature within a certain range. Optimization module 625 may recommend and/or automatically operate a plurality of barriers depending on such conditions as current outside temperature, wind speed, wind direction, humidity, and the like, to avoid having to operate an HVAC system while still maintaining a desired range of interior temperature for the home. In another example, optimization module 625 may optimize water consumption related to watering a yard (e.g., lawn, flower beds, trees, and bushes) based at least in part on, for example, outside temperature, precipitation, humidity, wind speed, and overcast conditions. The optimization module 625 may also receive sensor information from, for example, a ground moisture sensor in addition to the weather-related information. Optimization module 625 may then automatically operate a sprinkler system or provide recommended usage information to a user such that the sprinkler system operates for the least amount of time and distributes the least amount of water possible while still maintaining proper hydration for the yard.

Weather confirmation module 630 may operate to confirm whether forecasted weather actually occurs as predicted. Weather confirmation module 630 may receive weather-related information from a third party as well as from locally positioned sensors. The locally positioned sensors may provide real-time weather-related information such as, for example, temperature, humidity, precipitation, wind speed, etc. to confirm whether the forecasted weather condition of certain probability actually occurs. If the forecasted weather condition is not confirmed as occurring according to the forecast, weather module 120-a may modify its recommended actions sent to the user and/or modify the automated functions that occur (e.g., opening or closing doors and/or windows).

Figure 7:
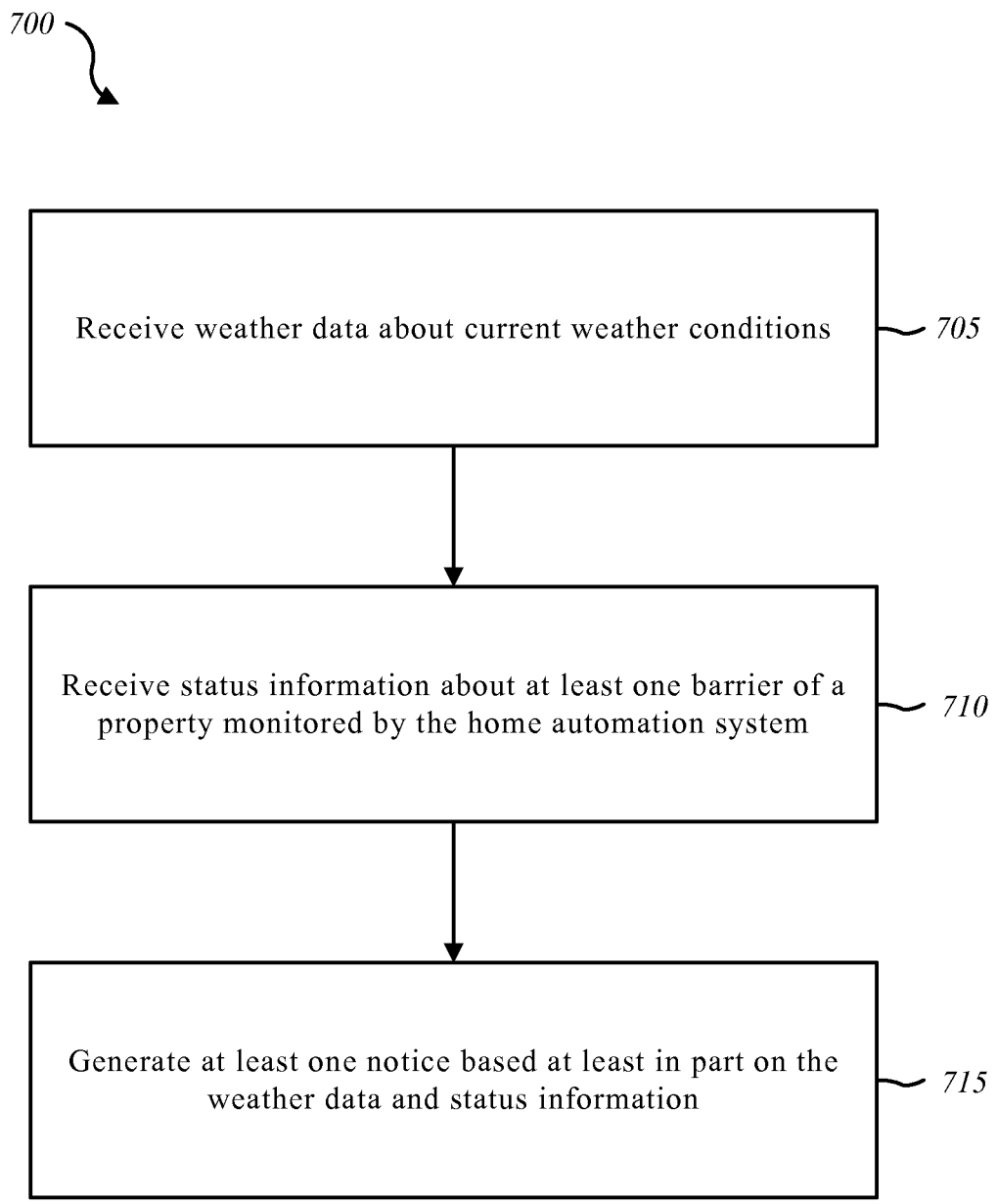
FIG. 7 is a flow diagram illustrating a method for generating weather related notices with a home automation system.

FIG. 7 is a flow diagram illustrating one embodiment of a method 700 for generating weather-related notices with a home automation system. In some configurations, the method 700 may be implemented with the weather module 120 described with reference to FIGS. 1-6. In other examples, the method 700 may be performed generally by device 105 shown in FIGS. 1-5, or even more generally by the environments 100, 200, 300, 400, 500 shown in FIGS. 1-5.

At block 705, method 700 includes receiving weather data about current weather conditions. Block 710 includes receiving status information about at least one barrier of a property monitored by the home automation system. At block 715, method 700 includes generating at least one notice based at least in part on the weather data and status information.

Providing status information about one or more barriers may include providing information about an open state of the one or more barriers. The weather information may include a probability of a weather event occurring. Generating the at least one notice may occur if the probability of the weather event exceeds a threshold probability level. At least one notice may include one of a displayed message and an audible message that the at least one barrier should be opened or closed. The weather information may include at least one of a temperature, a wind speed, and a chance of precipitation. The method 700 may include automatically opening or closing the at least one barrier based on the weather data. Method 700 may include receiving status information about at least one appliance at a property monitored by the home automation system, and automatically adjusting operation of the at least one appliance based on the weather data.

Figure 8:
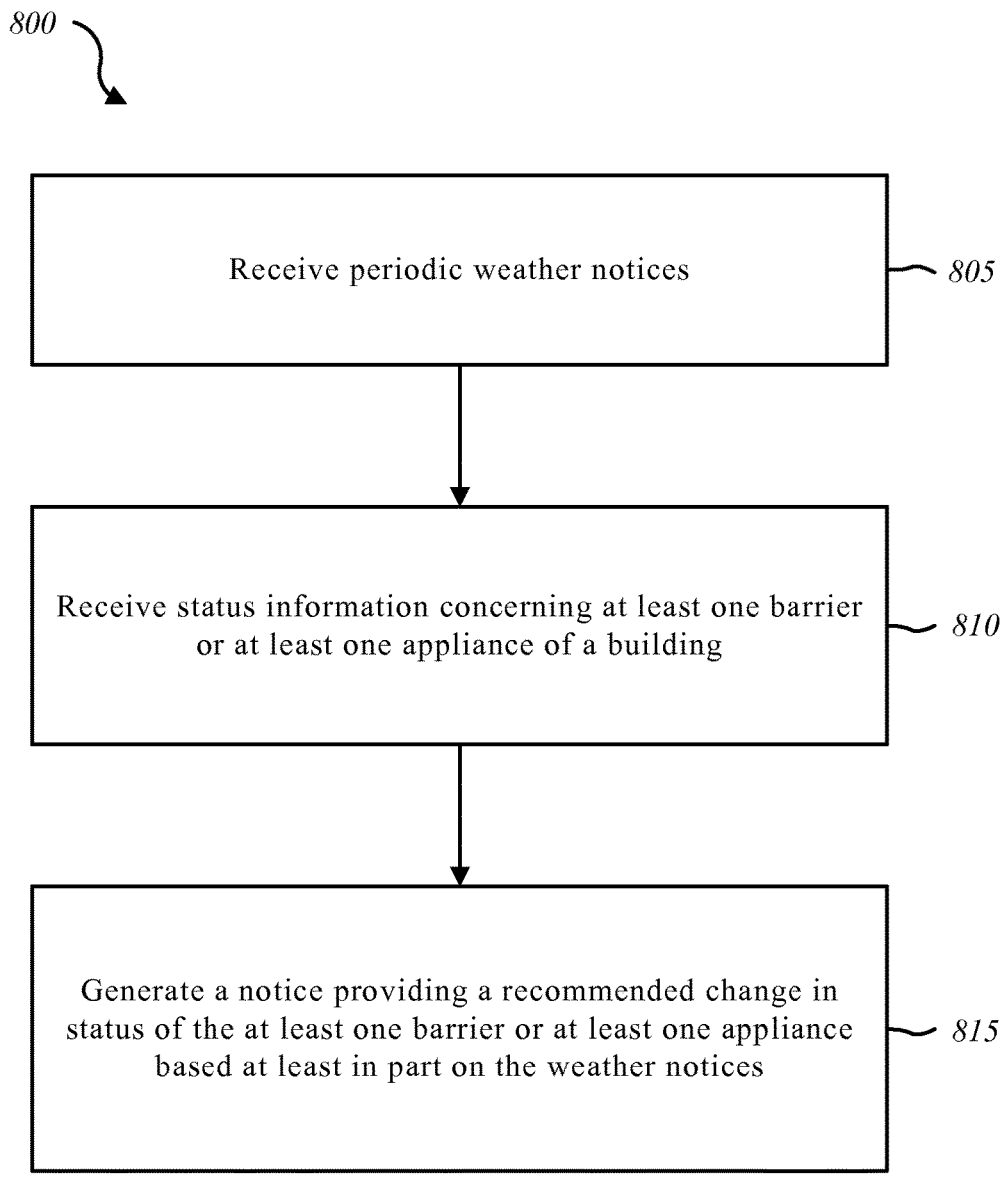
FIG. 8 is a flow diagram illustrating a method for generating weather condition based notices with a home automation system.

FIG. 8 is a flow diagram showing one example of a method 800 for generating weather condition-based notices with a home automation system. In some configurations, the method 800 may be implemented with the weather module 120 described with reference to FIGS. 1-6. In other examples, method 800 may be performed generally by device 105 shown in FIGS. 1-5, or even more generally by the environments 100, 200, 300, 400, 500 shown in FIGS. 1-5.

At block 805, method 800 includes receiving periodic weather notices. Block 810 includes receiving status information concerning at least one barrier or at least one appliance at a building. Block 815 of method 800 includes generating a notice providing a recommended change of status of the at least one barrier or at least one appliance based on the weather notices.

Method 800 may also include automatically operating the at least one barrier or the at least one appliance based at least in part on a weather notice. Method 800 may include displaying the notice on a control panel of the home automation system. Method 800 may include transmitting the notice to a remote handheld device. The notice may include at least one of a graphic, a sound, a light indicator, or a vibration. The periodic weather notices may be routed through a backend server to a control panel of the home automation system.

Figure 9:
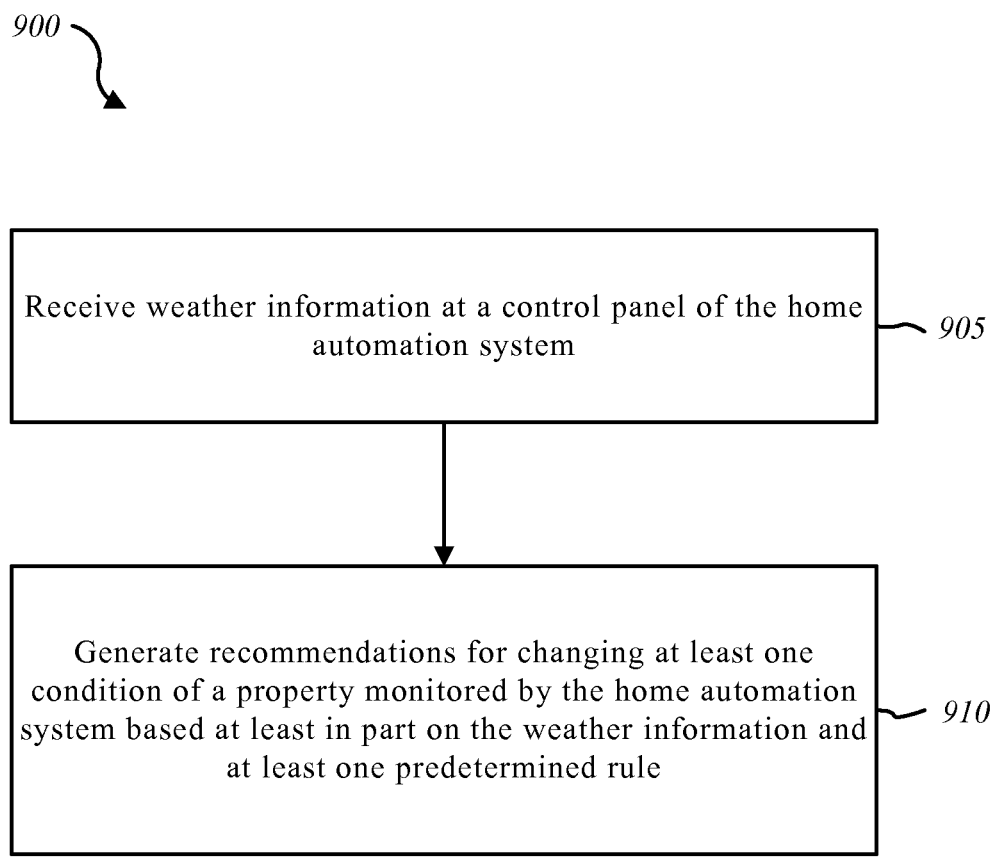
FIG. 9 is a flow diagram illustrating a method for processing weather information with a home automation system.

FIG. 9 is a flow diagram illustrating one embodiment of a method 900 for processing weather information with a home automation system. In some configurations, the method 900 may be implemented with the weather module 120 described with reference to FIGS. 1-6. In other examples, method 900 may be performed generally by device 105 shown in FIGS. 1-5, or even more generally by the environments 100, 200, 300, 400, 500 shown in FIGS. 1-5.

At block 905, the method 900 includes receiving weather information at a control panel of the home automation system. Block 910 of method 900 includes generating recommendations for changing at least one condition of a property monitored by the home automation system based at least in part on the weather information and at least one predetermined rule.

The weather information may be received from a backend server of the home automation system. The at least one condition may be at least one of an open state of at least one barrier of the property, an operation state of a sprinkler system of the property, and an operation state of an HVAC system of the property. The at least one predetermined rule may include one of a threshold temperature and a threshold chance of precipitation. Receiving weather information may include receiving weather information from at least one of the remote weather database and at least one local weather sensor. Method 900 may include delivering the recommendations to at least one user of the property.

Figure 10:
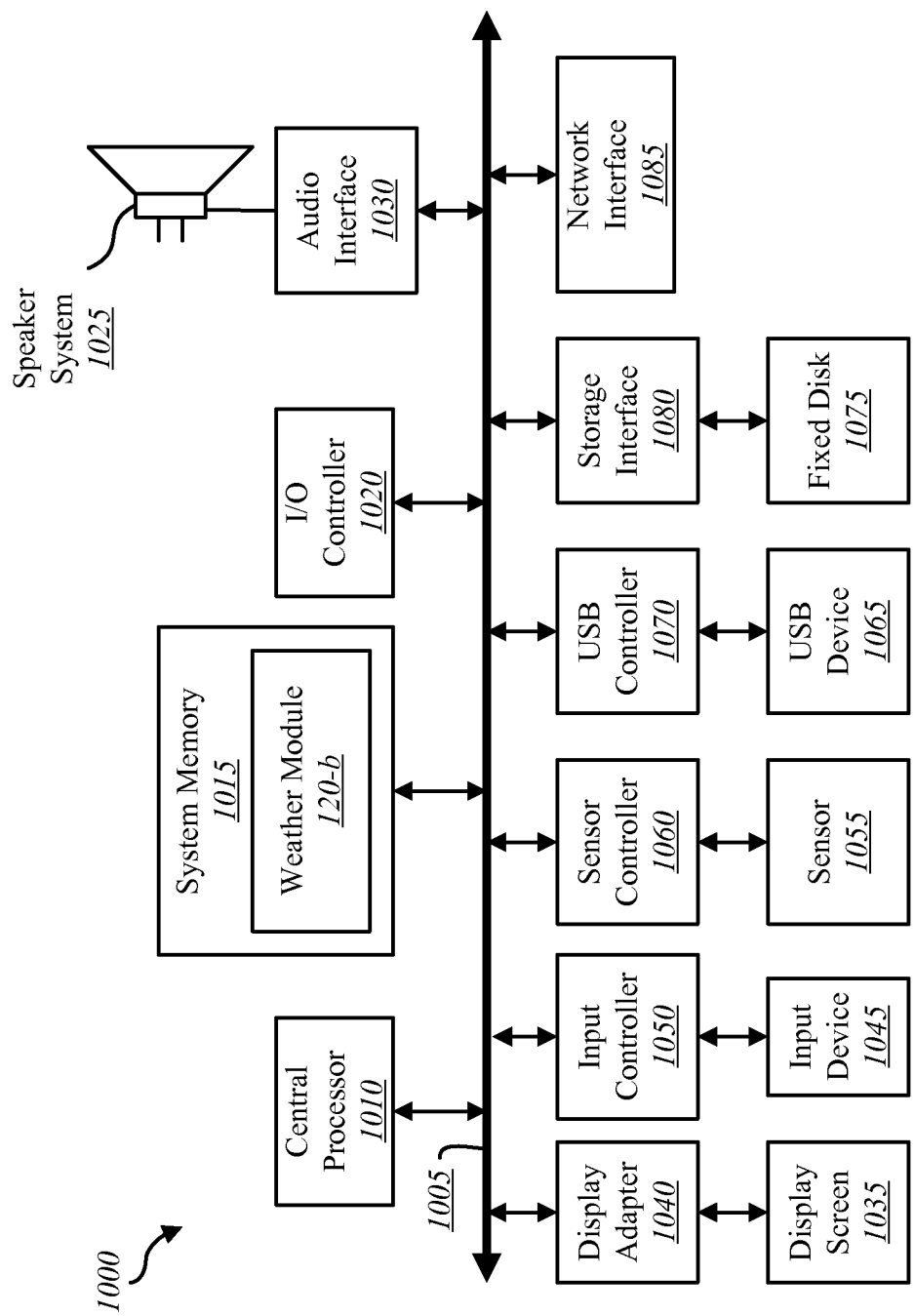
FIG. 10 is a block diagram of a computer system suitable for implementing the present systems and methods of FIGS. 1-9.

FIG. 10 depicts a block diagram of a controller 1000 suitable for implementing the present systems and methods. The controller 1000 may be an example of the device 105 illustrated in FIGS. 1, 2, 3, 4 and/or 5 or the controller 315 shown in FIGS. 3, 4 and/or 5. In one configuration, controller 1000 includes a bus 1005 which interconnects major subsystems of controller 1000, such as a central processor 1010, a system memory 1015 (typically RAM, but which may also include ROM, flash RAM, or the like), an input/output controller 1020, an external audio device, such as a speaker system 1025 via an audio output interface 1030, an external device, such as a display screen 1035 via display adapter 1040, an input device 1045 (e.g., remote control device interfaced with an input controller 1050), multiple USB devices 1065 (interfaced with a USB controller 1070), and a storage interface 1080. Also included are at least one sensor 1055 connected to bus 1005 through a sensor controller 1060 and a network interface 1085 (coupled directly to bus 1005).

Bus 1005 allows data communication between central processor 1010 (e.g., controller 315) and system memory 1015, which may include read-only memory (ROM) or flash memory (neither shown), and random access memory (RAM) (not shown), as previously noted. Weather module 120-b, which may be one example of the weather modules 120 disclosed with reference to FIGS. 1-6 may be stored in system memory 1015. The RAM is generally the main memory into which the operating system and application programs are loaded. The ROM or flash memory can contain, among other code, the Basic Input-Output system (BIOS) which controls basic hardware operation such as the interaction with peripheral components or devices. Applications (e.g., application 505) resident with controller 1000 are generally stored on and accessed via a non-transitory computer readable medium, such as a hard disk drive (e.g., fixed disk 1075) or other storage medium. Additionally, applications can be in the form of electronic signals modulated in accordance with the application and data communication technology when accessed via network interface 1085.

Storage interface 1080, as with the other storage interfaces of controller 1000, can connect to a standard computer readable medium for storage and/or retrieval of information, such as a fixed disk drive 1075. Fixed disk drive 1075 may be a part of controller 1000 or may be separate and accessed through other interface systems. Network interface 1085 may provide a direct connection to a remote server via a direct network link to the Internet via a POP (point of presence). Network interface 1085 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 1000 wirelessly via network interface 1085.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 10 need not be present to practice the present systems and methods. The devices and subsystems can be interconnected in different ways from that shown in FIG. 10. The aspect of some operations of a system such as that shown in FIG. 10 are readily known in the art and are not discussed in detail in this application. Code to implement the present disclosure can be stored in a non-transitory computer-readable medium such as one or more of system memory 1015 or fixed disk 1075. The operating system provided on controller 1000 may be iOS®, ANDROID®, MS-dOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. An apparatus for generating weather related notices with a home automation system, comprising:
    a processor;
    a memory in electronic communication with the processor; and
    instructions stored in the memory, the instructions being executable by the processor to: sense a first set of weather data by a sensor about current weather conditions within a predefined proximity to a property;
    receive a second set of weather data from a weather database, remote from the predefined proximity to the property, providing the weather data for an area that covers the predefined proximity; determine a difference between the first set of weather data and the second set of weather data;
    receive status information about at least one barrier of the property monitored by the home automation system; and
    generate at least one notice associated with adjusting at least a second barrier different from the at least one barrier based at least in part on the first set of weather data, the second set of weather data, and status information, wherein the first set of weather data is given a higher priority than the second set of weather data in generating the at least one notice based at least in part on the determination.

2. The apparatus of claim 1, wherein the status information about the at least one barrier includes information about an open state of the at least one barrier.

3. The apparatus of claim 1, wherein the first set of weather data includes a probability of a weather event occurring.

4. The apparatus of claim 3, wherein generating the at least one notice occurs if the probability of the weather event exceeds a threshold probability level.

5. The apparatus of claim 1, wherein the at least one notice includes one of a displayed message and an audible message that the second barrier should be opened or closed.

6. The apparatus of claim 1, wherein the first set of weather data includes at least one of a temperature, a wind speed, and a chance of precipitation.

7. The apparatus of claim 1, wherein the instructions are executable by the processor to:
    automatically open or close the at least one barrier or the second barrier based on the first set of weather data, or the second set of weather data, or both.

8. The apparatus of claim 1, wherein the instructions are executable by the processor to:
    receive status information about at least one appliance of a property monitored by the home automation system; and
    automatically adjust operation of the at least one appliance based on the first set of weather data, or the second set of weather data, or both.

9. A non-transitory computer-readable medium storing instructions executable by a processor to:
    sense a first set of weather data periodically by a sensor, wherein the first set of weather data comprises at least current weather conditions within a predefined proximity to a building;
    receive a second set of weather data from a weather database, remote from the predefined proximity to the property, providing the weather data for an area that covers the predefined proximity;
    determine a difference between the first set of weather data and the second set of weather data;
    receive status information concerning at least one barrier or at least one appliance of a building; and
    generate a notice providing a recommended change in status of at least a second barrier different from the at least one barrier or at least a second appliance different from the at least one appliance based at least in part on the first set of weather data, the second set of weather data, and the status information, wherein the first set of weather data is given a higher priority than the second set of weather data in generating the at least one notice based at least in part on the determination.

10. The non-transitory computer-readable medium of claim 9, wherein the instructions are executable by the processor to:
    automatically operate the second barrier or the second appliance based at least in part on the weather notices.

11. The non-transitory computer-readable medium of claim 9, wherein the instructions are executable by the processor to:
    display the notice on a control panel of the home automation system.

12. The non-transitory computer-readable medium of claim 9, wherein the instructions are executable by the processor to:
    transmit the notice to a remote handheld device.

13. The non-transitory computer-readable medium of claim 9,
    wherein the notice includes at least one of a graphic, a sound, a light indicator, or a vibration.

14. The non-transitory computer-readable medium of claim 9, wherein the first set of weather data and the second set of weather data is routed through a backend server to a control panel of the home automation system.

15. A computer-implemented method for processing weather information with a home automation system, comprising:

receiving a first set of weather information at a control panel of the home automation system from a sensor located within a predefined proximity to a property, wherein the first set of weather information comprises at least weather data about current weather conditions;

receiving a second set of weather information from a weather database, remote from the predefined proximity to the property, providing the weather data for an area that covers the predefined proximity;

determining a difference between the first set of weather information and the second set of weather information;

receiving status information about at least one condition associated with the property; and generating a recommendation for changing at least a second condition different from the at least one condition based at least in part on the first set of weather information, the second set of weather information, the status information, and at least one predetermined rule, wherein the first set of weather information is given a higher priority than the second set of weather information in generating the recommendation based at least in part on the determination.

16. The method of claim 15, wherein the first set of weather information and the second set of weather information is received at least in part from a backend server of the home automation system.

17. The method of claim 15, wherein the at least one condition is at least one of an open state of at least one barrier of the property, an operation state of a sprinkler system of the property, and an operation state of an HVAC system of the property.

18. The method of claim 15, wherein the at least one predetermined rule includes one of a threshold temperature and a threshold chance of precipitation.

19. The method of claim 15, further comprising:
delivering the recommendations to at least one user of the property.

* * * * *